June 24, 1969 I. E. HEFNI 3,452,305

MICROWAVE SEMICONDUCTIVE DEVICE MOUNT

Filed Feb. 28, 1967

INVENTOR
I. E. HEFNI
BY

ATTORNEY 3,452,305

MICROWAVE SEMICONDUCTIVE DEVICE MOUNT

Ibrahim E. Hefni, North Andover, Mass., assignor to Bell Telephone Laboratories, Incorporated, Murray Hill, N.J., a corporation of New York Filed Feb. 28, 1967, Ser. No. 619,433
Int. Cl. H01p 7/06, 1/22; H03d 9/02
U.S. Cl. 333—83 4 Claims

ABSTRACT OF THE DISCLOSURE

A semiconductive element such as a diode is mounted in a waveguide iris shaped in the form of two different sized connected openings which together are resonant. The diode is mounted in one opening and dimensions of the other determine the Q and the resonant frequency of the combination.

*Background of the invention*

Semiconductive devices such as rectifying diodes, varactor diodes, Schottky barrier diodes, PIN diodes and the like as used in detectors, parametric amplifiers, and modulators are now usually mounted in waveguides of reduced height. The reduced height serves to minimize the effect of parasitic elements commonly associated with large mounts which would otherwise be combined with the diode reactance to cause spurious responses. Since the input and output ports, however, are full height guides, transducers in the form of stepped or tapered transitions are required. These transducers add expense, size and undesirable electrical properties to the device.

*Summary of the invention*

In accordance with the invention the reduced height guide of the prior art together with its transitions is eliminated by mounting the semiconductive device or diode in a resonant iris. The shape of the iris is made up of two parts in the form of different sized connected openings. The first part is tailored to the physical dimensions of the diode and to eliminate parasitic effects while the second part, which tunes to resonance with the first part, has proportions which determine the Q and the resonant frequency of the combination.

In accordance with a preferred embodiment the height of the iris in the part containing the diode is made as small as possible while still accommodating the diode, and the height of the other part is made large to broaden the band of the combination. A capacitive screw associated with the second part facilitates the adjustment. The invention can be extended to multiple diode mounts.

*Description of preferred embodiment*

Figure 1:
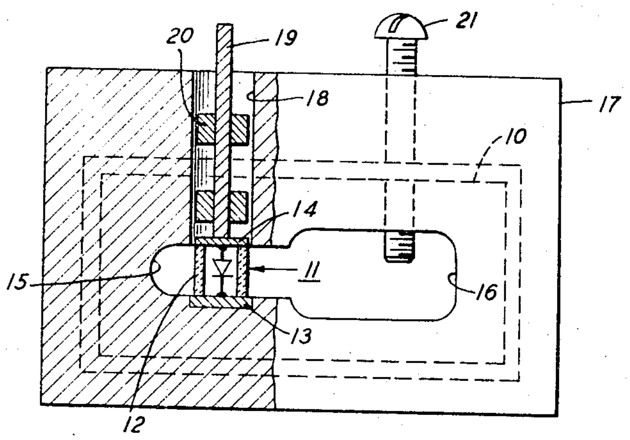
FIG. 1 is a partial cross-sectional view taken through a diode mount in accordance with the invention.

Referring more particularly to FIG. 1, guide 10, represented only by the outline of its inside wall, is a conductive rectangular waveguide of standard internal dimensions to which is to be coupled a standard semiconductive device represented by diode 11. The mounting to be described is intentionally designed to accommodate a stock diode packaged with the usual ceramic case 12, a relatively large conductive base terminal 13 and a small conductive top terminal 14, but it will become apparent that the particular form of the diode has no bearing upon the principles of the invention. Thus diode 11 is disposed within an aperture 15–16 cut through the thickness of plate 17 suitably forming a partition across guide 10. As illustrated plate 17 is larger than guide 10 and is arranged to be conductively fastened between abutting ends of separate waveguide sections, but the partition may be alternatively arranged to fit within the cross-section of a continuous guide, either conductively bounded thereto or entirely insulated therefrom by virtue of a small dielectric gap. The thickness of partition 17 measured parallel to the longitudinal axis of guide 10 depends upon the incidental package of diode 11. In the form illustrated it is preferred that the thickness of partition 17 be just sufficient to accommodate the diameter of base terminal 13 which base can then be recessed into the bottom edge of aperture 15–16 at a point displaced from the axis of guide 10. Diode 11 is fed with the desired radio frequency modulating signal and the required DC bias by means of a low-pass coaxial filter 20 built into bore 18 through the edge of partition 17. The coax filter which acts as a radio frequency choke for the microwave frequency has a center conductor 19 which contacts top terminal 14, an outer conductor comprising or at least coupled to the boundary of bore 18 and spaced conductive enlargements which introduce the desired reactances. The structure thus far described is considered well known in the art, for which many variations are known, and requires no further detailed description.

The present invention is concerned with the shape of aperture 15–16 which will be considered as made up of two parts or connected openings 15 and 16, respectively, which merge near the center of guide 10 to form a composite iris in partition 17. Parts 15 and 16 have different E plane dimensions measured parallel to the narrow wall of guide 10 and individual shapes which may be rectangular, ovoid, or rectangular with rounded corners. More complicated shapes may be used but these tend to overcomplicate design calculations.

It is not believed to be within the scope of this application to develop in any detail the well-known mathematics which control the design of waveguide irises. For this purpose, reference may be had to any standard microwave textbook. It is necessary to understand in a general way, however, that the inductive reactance of an iris in a rectangular waveguide depends upon the amount of restriction of the guide cross section in the H plane (parallel to the wide wall) while its capacitive reactance depends upon the amount of restriction in the E plane (parallel to the narrow wall). A resonant iris is one in which the capacitive reactance is equal to the inductive reactance. Well-known equations in the art define the multiple ratios of the E plane to H plane dimensions of an iris of a given shape to produce resonance. If the ratio is larger than that defining resonance, the iris has a net inductive reactance, and if the ratio is smaller than that defining resonance, the iris has a net capacitive reactance. Finally, the Q of an iris and therefore its bandwidth depends upon the ratio of inductance to resistance. Therefore, the larger the E plane dimension of the iris, the lower its Q and the broader its band.

With these principles in mind it may be noted that diode 11 is disposed within part 15 which has an E plane dimension equal substantially to the distance between the top and bottom conductive terminals 13 and 14 of diode 11. Being thus tailored to the physical dimension of a given diode, all parasitic influences associated with the lead connections and conductive parts resulting from the diode packaging are eliminated from the microwave frequency circuit. The E plane dimension of part 15 is to this extent predetermined.

Treating each part 15 and 16 as though this part were a separate iris, the H plane dimension of part 15 is large compared to that producing resonance for the predetermined E plane dimension so that part 15 has a capacitive reactance. In the usual case the reactance of diode 11 is also capacitive, further increasing the capacity of part 15. The dimensions of part 16 are then free to determine a net inductive reactance to tune with the capacity of part 15 and set the resonant frequency of the combined circuit including parts 15 and 16 and the reactance of diode 11. The dimensions of part 16 also determine the Q of the circuit. In particular, part 16 has a larger E plane dimension than part 15 and has an E plane to H plane ratio which is large compared to that ratio determining resonance. The net reactance of part 16 is then inductive; the larger the ratio, the greater the reactance, the smaller the Q, and the broader the bandwidth. A capacitive tuning screw 21 disposed in part 16 has a large effect upon the net reactance of this part and therefore facilitates any adjustment.

Figure 2:
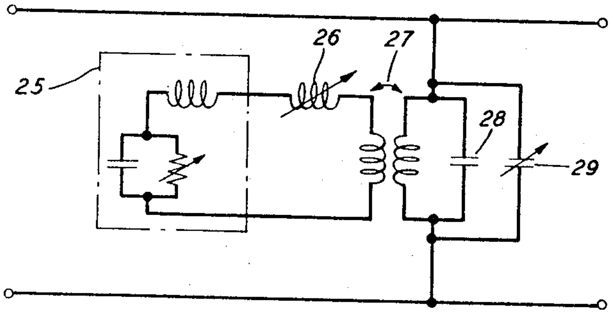
FIG. 2 shows the approximate equivalent circuit of the structure of FIG. 1.

The foregoing and other relationships are readily illustrated by the approximate equivalent circuit shown in FIG. 2. Diode 11 for the particular example is assumed to be a PIN diode and is therefore represented in the usual way by the components within box 25 including a capacity shunted by a variable resistance together in series with a small inductance. Its net reactance is capacitive. Inductance 26 represents the variable inductive effect on the circuit of the position of choke 20 relative to diode 11. The iris inductance, which is primarily that of part 16, may be represented by coupled inductances 27 for which the mutual inductance or transformer action therebetween depends upon the strength of E field at the plane of diode 11. Finally, the iris capacity, which is primarily that of part 15, is represented by capacitance 28. The capacity of screw 21 is represented by capacity 29 in shunt with capacity 28. It will be apparent that the resulting circuit can be tuned to resonance over a broad range by capacity 29 and the Q of this circuit depends upon inductance 27 in turn controlled by the E plane dimension of part 16.

Figure 3:
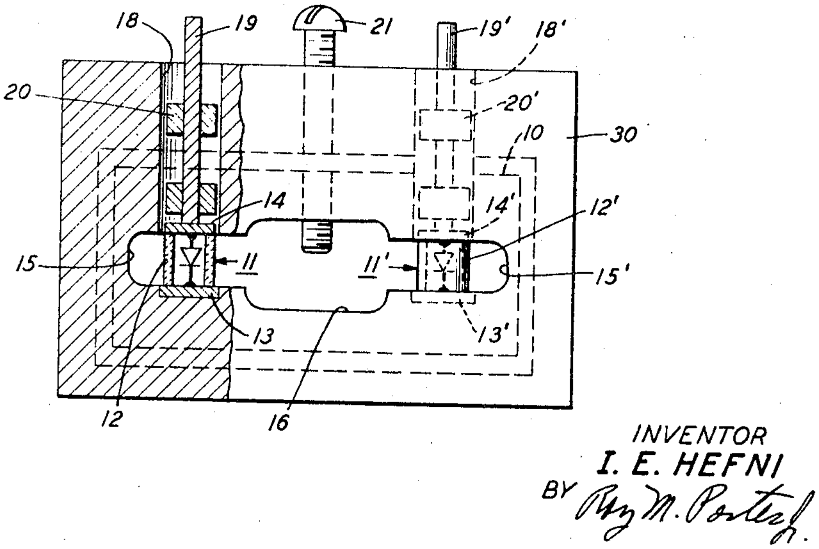
FIG. 3 is a cross-sectional view of a multiple diode mount in accordance with the invention.

FIG. 3 illustrates how the principles of the invention may be applied to mounting dual diodes, useful alternatively for parallel or push-pull detectors or modulators, either balanced or unbalanced, depending upon the external connections. In FIG. 3, components corresponding to those of FIG. 1 have been given corresponding reference numerals and components of the second diode which duplicate those of the first have been given primed reference numerals. Modification will be seen to reside only in the fact that partition 30 includes three parts, i.e., a centrally arranged part 16 of large E plane dimension and two side parts 15 and 15' of reduced E plane dimension. Parts 15 and 15' tune together with part 16 in the same way as described with reference to FIG. 1. While not a necessary relationship, it is conveniently designed to divide the net capacitive reactance of part 15 of FIG. 1 between parts 15 and 15' by varying somewhat the ratio of their E to H plane dimensions as compared to the corresponding ratio of part 15 of FIG. 1.

It should be understood that those particular shapes making up the composite iris, in accordance with the invention that have been selected for illustration herein, are merely ones which seem to have particular advantage and to produce the simplest configuration. Other shapes and other relative arrangements of shapes within a composite iris will readily occur to those skilled in the art.

In all cases, it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. A semiconductive device having a pair of spaced conducting terminals in combination with a conductively bounded waveguide having respective wide and narrow cross sectional dimensions for coupling high frequency electromagnetic wave energy to said device, each terminal being contacted by an electrically conducting lead for coupling lower frequency electrical energy to said device but having potential parasitic influences upon said high frequency energy, the spacing between said terminals measured along an axis perpendicular to the planes of said terminals being small compared to said narrow dimension, means for coupling said device to said guide over a wide band of electromagnetic wave energy to the exclusion of said parasitic influences, said last named means comprising a conducting partition extending transversely across said guide and having an aperture therein, said aperture shaped as at least two different sized connected parts, said device being disposed in one of said parts which one part has a dimension parallel to said narrow dimension that exposes said device to said high frequency energy and isolates said leads from said high frequency energy, and the other of said parts having a dimension parallel to said narrow dimension that is larger than said dimension of said first part so that said aperture together with said device is resonant over said wide band.

2. The combination according to claim 1 wherein said one of said parts has a ratio of wide to narrow dimension that is smaller than that ratio which would produce resonance in said one part, and wherein said other of said parts has a ratio of wide to narrow dimension that is larger than that ratio which would produce resonance in said other part.

3. The combination according to claim 1 wherein said one of said parts is proportioned to have a net capacitive reactance and wherein said other of said parts is proportioned to have a net inductive reactance.

4. A semiconductive device having a pair of spaced conducting terminals in combination with a conductively bounded wavegude having respective wide and narrow cross sectional dimensions, the spacing between said terminals measured along an axis perpendicular to the planes of said terminals being small compared to said narrow dmension, means for coupling said device to said guide over a wide band of electromagnetic wave energy comprising a conducting partition extending transversely across said guide and having an aperture therein, said aperture shaped as at least two different sized connected parts, at least one of said parts having a dimension parallel to said narrow dimension that is small compared to said narrow dimension and comparable to said spacing, said device being disposed in said one part with said axis parallel to said narrow dimension, and the other of said parts having a dimension parallel to said narrow dimension that is larger than said dimension of said first part so that said aperture together with said device is resonant over said wide band.

References Cited

UNITED STATES PATENTS

| | | | |
|---|---|---|---|
| 2,524,179 | 11/1950 | Schneider. | |
| 2,668,276 | 2/1954 | Schooley. | |
| 2,505,534 | 4/1950 | Fiske | 333—98 |
| 3,141,141 | 7/1964 | Sharpless | 333—83 |
| 3,175,218 | 3/1965 | Goebels | 333—98 |

HERMAN K. SAALBACH, *Primary Examiner.*

L. ALLAHUT, *Assistant Examiner.*

U.S. Cl. X.R.

329—161; 333—98

PO-1050
(5/69)

UNITED STATES PATENT OFFICE
CERTIFICATE OF CORRECTION

Patent No. 3,452,305 Dated June 24, 1969

Inventor(s) Ibrahim E. Hefni

It is certified that error appears in the above-identified patent and that said Letters Patent are hereby corrected as shown below:

Column 4, lines 29 and 32, those phrases of claim 2 reading "wide to narrow" should read --narrow to wide--.

SIGNED AND
SEALED

DEC 2 - 1969

(SEAL)
Attest:

Edward M. Fletcher, Jr.
Attesting Officer

WILLIAM E. SCHUYLER, JR.
Commissioner of Patents